United States Patent
Hegeman et al.

(10) Patent No.: US 6,200,455 B1
(45) Date of Patent: *Mar. 13, 2001

(54) METHOD FOR REDUCING THE PLATING OF NICKEL ON VESSELS, PIPING AND CELLS IN AN ALKALI METAL HYDROXIDE MANUFACTURING PROCESS

(75) Inventors: John William Hegeman; Todd Richard Pickle; Gary Lee Sulik, all of Henderson, NV (US)

(73) Assignee: Pioneer (East) Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/419,687

(22) Filed: Oct. 14, 1999

(51) Int. Cl.$^7$ ........................................... C25B 1/16
(52) U.S. Cl. ..................... 205/508; 205/510; 205/516; 205/536
(58) Field of Search ................... 205/508, 510, 205/516, 536

(56) References Cited

U.S. PATENT DOCUMENTS

| | | | |
|---|---|---|---|
| 3,944,479 | 3/1976 | Ruthel et al. | 204/297 R |
| 4,025,405 | 5/1977 | Dotson et al. | 205/512 |
| 4,039,568 | 8/1977 | Kobayashi et al. | . |
| 4,065,376 | 12/1977 | Schulz et al. | 204/263 |
| 4,252,878 | 2/1981 | Lazarz et al. | 429/250 |
| 4,260,469 | 4/1981 | McIntyre et al. | 204/265 |
| 4,963,235 | * 10/1990 | Brattan et al. | 204/98 |
| 5,290,470 | 3/1994 | Dutcher | 510/109 |

OTHER PUBLICATIONS

Eriez Manufacturing Co., Ferrous Traps (SB–420P), 1998, 8 pages, no month available.

OxyTech Systems, Inc. (Tilak Bommaraju & Paul Orosz), Caustic Evaporator Coorosion: Causes and Remedy, Mar. 1992, 15 pages.

* cited by examiner

*Primary Examiner*—Arun S. Phasge
(74) *Attorney, Agent, or Firm*—Wendy K. Buskop; Buskop Law Group PC

(57) ABSTRACT

A method to prevent cladding or plating of metals, such as nickel or iron in a continuous production of alkali metal hydroxides which involves several steps: electrolyzing an aqueous alkali metal salt solution forming hydrogen, chlorine and an at least 10% caustic solution at a temperature of from about 75 to about 100 F; and treating said at least 10% caustic solution to create a more concentrated caustic solution while continuously and magnetically removing up to 33% of the metals present in the solution from the at least 10% caustic solution using a first magnet prior to evaporation, flashing and cooling of the at least 10% caustic solution, and then magnetically removing an additional amount of metals from the resultant more concentrated caustic solution again with a second magnet prior to filtration of the more concentrated caustic solution.

20 Claims, 2 Drawing Sheets

METHOD FOR REDUCING THE PLATING OF NICKEL ON VESSELS, PIPING AND CELLS IN AN ALKALI METAL HYDROXIDE MANUFACTURING PROCESS

BACKGROUND

The present invention relates to the manufacture of alkali metal hydroxides, commonly known as caustic. Alkali metal hydroxides are typically from the group which includes sodium, lithium, cesium, potassium and rubidium. Caustic is made using different types of electrolytic cells, including membrane and diaphragm-type cells and then further treating the caustic to concentrate the solution. The present invention is directed to the method of further treating sodium hydroxide caustic which was created using a diaphragm electrolytic chlorine cell, but it is contemplated that this method of manufacture can be utilized in other alkali metal hydroxide processes to reduce the plating of metal on production equipment.

A need has long existed in the caustic industry for a technique to remove metals, such as nickel and/or iron from build up on the insides of manufacturing vessels and piping which occurs during the caustic manufacturing process without adding additional chemicals to the process. A need has existed for an environmentally friendly method to reduce metal plating buildup which lowers the cost to manufacture caustic, lowers the turn around time for the manufacturing facilities and can be usable in any alkali metal hydroxide manufacturing process.

Alkali metal hydroxide solutions have been prepared by the electrolysis of alkali metal salt solutions in electrolytic cells. Diaphragm cells are known for producing alkali metal hydroxide solutions electrolytically. In this type of cell, a porous cathode with an overlying porous diaphragm is used to separate or to serve as a barrier between the catholyte and anolyte compartments of the cell. After separation of the components, the caustic solution is then further treated to increase the concentration of caustic in the solution. An objectionable feature of known methods for handling this process to increase caustic concentration is that the process can require the addition of sodium borohydride to the caustic solution to minimize the reaction of hot caustic with the first device for driving off water, which is commonly known as the "first effect evaporator". The first effect evaporator is usually nickel or coated nickel and the caustic reacts with the nickel causing the build up of hydrated nickel oxide on the interiors of the remaining processing equipment. The use of the sodium borohydride has produced a significant build up of nickel oxides as well as free nickel in the manufacturing process on the vessels, pipes and valves used in the process. The build up on the processing equipment results in increased maintenance and decreased operating efficiency. This invention overcomes this buildup.

The present invention is directed at a method for reducing the amount of free nickel and nickel oxides, free iron and ferrous oxides in the chlor-alkali systems, particularly for the diaphragm types of cells without the need for additional chemicals, additional sodium borohydride, or other contaminants.

In order to overcome the disadvantages of the prior art the present invention proposes the use of magnets in situ in the manufacturing process to overcome these problems with the nickel and the iron.

SUMMARY OF THE INVENTION

The present invention relates to an alkali metal hydroxide manufacturing process and a unique method to reduce the amount of metal build up on the interiors of reaction vessels and piping. The method involves using at least two magnets to remove various metals, including free nickel oxides and nickel particulate and iron oxides, ferrous oxides and in the aqueous alkali metal hydroxide manufacturing process. As the metals disengage from the deposit sites of the manufacturing process, the magnets collect the metals without the need to stop the manufacturing process to clean the manufacturing equipment, vessels and piping.

The method involves passing a cell liquor containing about 10–13 wt % caustic through a first magnet at a flow rate of about 600–900 gallons per minute removing a significant amount of metal, such as nickel and iron forming a first fluid, then evaporating a significant amount of water out of that first fluid and raising the temperature of that first fluid to above 225 F. Typically sodium borohydride is then added to the solution and it is heated again above 330 F. After this step this resulting more concentrated caustic solution is cooled to a temperature of between about 75 and 100 F forming a cooled solution. The cooled solution is passed through a second magnet and additional metal, such as additional nickel and additional iron is magnetically removed forming a second cooled solution. This solution is then filtered and then passed through an optional third magnet to remove additional remaining metals forming a more highly concentrated caustic solution with a low presence of metals.

Two additional magnets can be used in this novel process to reduce metal cladding during production.

It is an object of this invention to provide a method, which enables caustic to be manufactured in a more environmentally friendly manner with shorter maintenance turn around times, and less maintenance than was required in commercially known processes.

It is an object of this invention to provide a method by which caustic can be manufactured less expensively than known techniques by reducing the amount of metal cladding occurring during the manufacturing process on the equipment.

These and other objects and advantages of the invention disclosed herein will become apparent to those skilled in the art from a reading of the following specification and the appended claims and by reference to the attached Figures.

DETAILED DESCRIPTION

Figure 1:
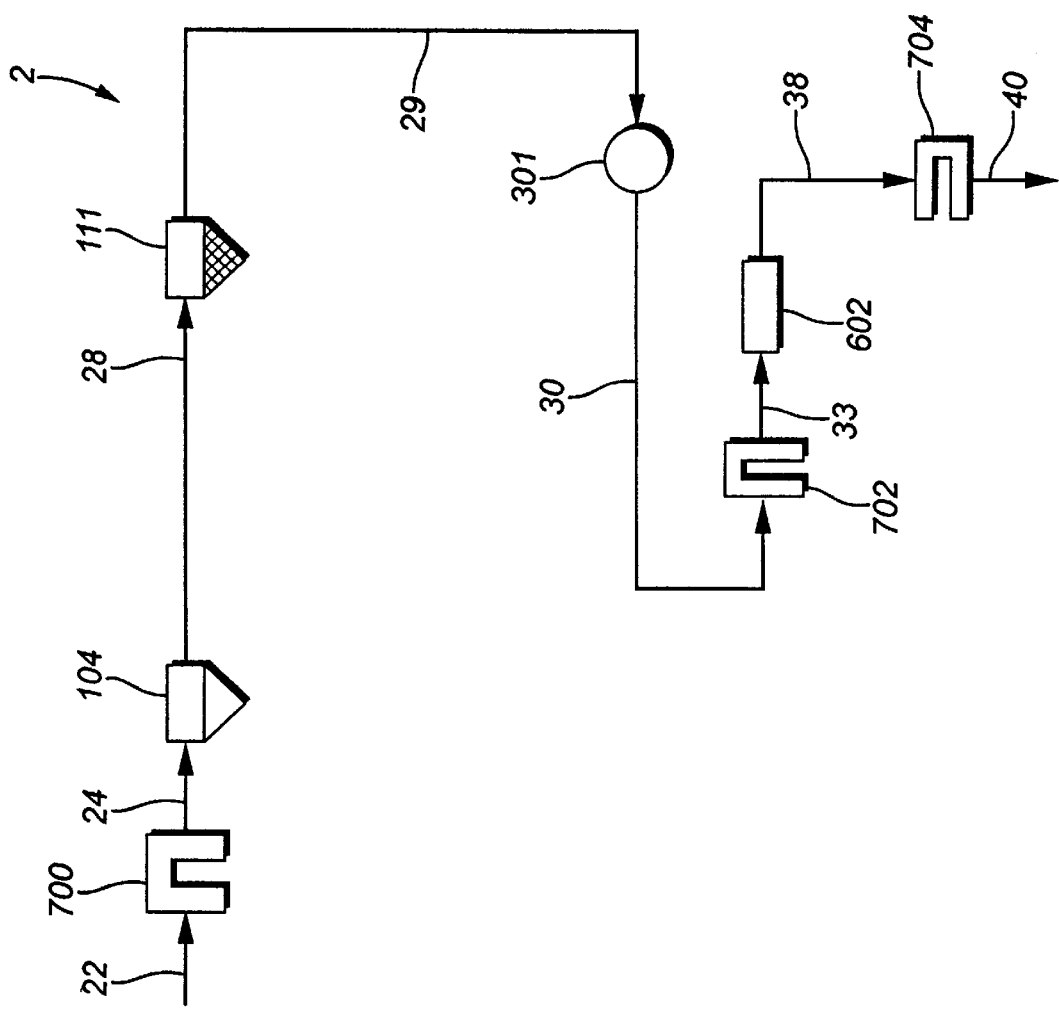
FIG. 1 is a flow chart describing a unique method for removal of metal from a manufacturing process for the production of alkali metal hydroxide solutions to inhibit cladding and to reverse the effect of metal plating in the manufacturing process.
Figure 2:
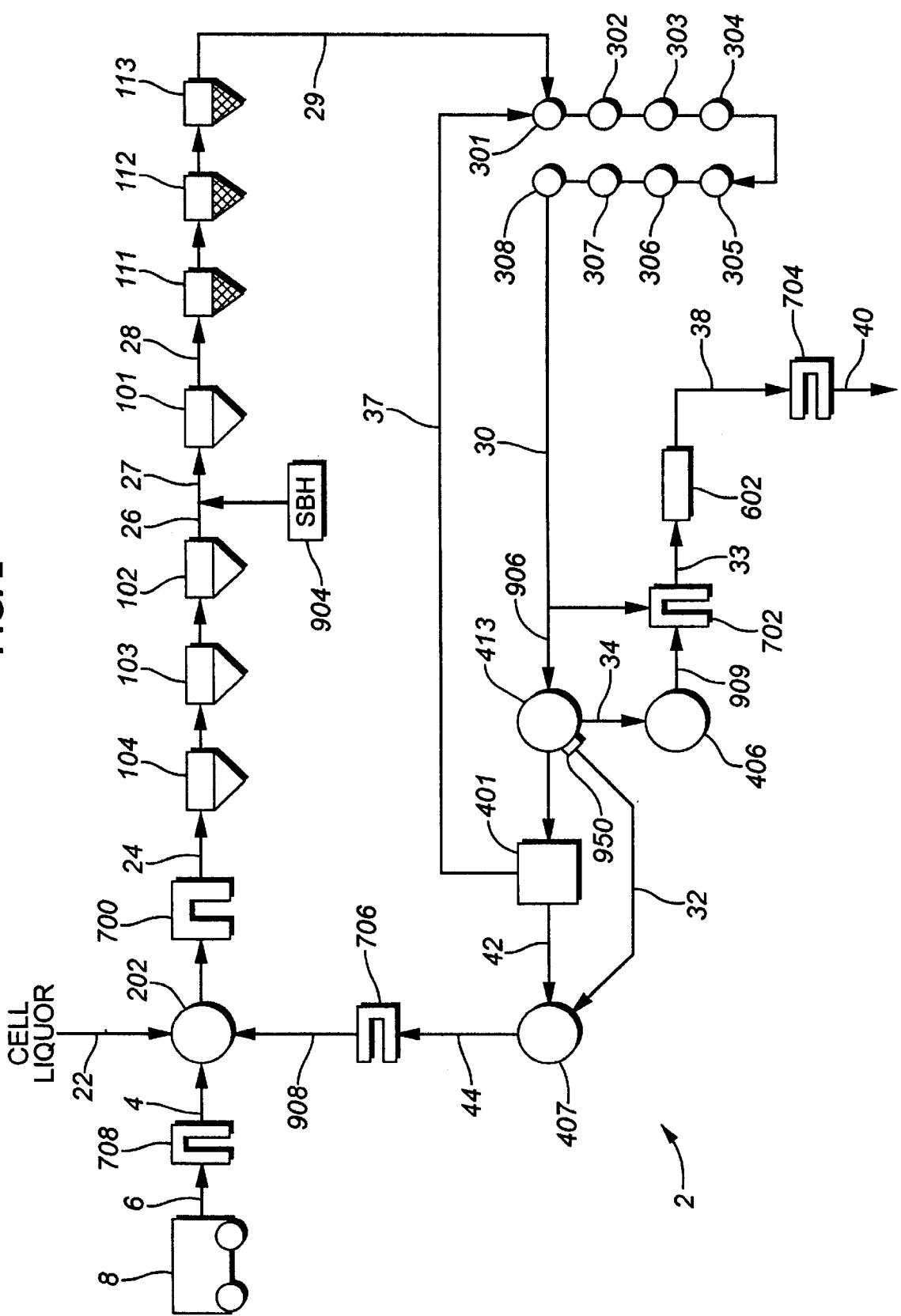
FIG. 2 is a detailed flow chart describing a unique chlor-alkali manufacturing process using the magnetic traps to reduce cladding and plating of nickel and iron.

Referring to FIGS. 1 and 2, the invention relates to a caustic manufacturing process (2), such as a chlor alkali manufacturing process which utilizes magnets, most preferably tubular magnets to prevent metals, such as metal particulates, metal oxides and metal hydrides, such as of nickel and/or iron from coating the manufacturing vessels and piping.

The following terms will be used to describe this invention:

"Iron" refers to iron particles, iron compounds, and free iron, which are not in solution, including but not limited to iron oxides (Fe2O3, Fe3O4), iron hydrides and particulates of iron metal, various of iron oxides and ferrides (Fe O4—).

"Nickel" refers to nickel particles, nickel compounds, and free nickel, which are not in solution, including but not limited to nickel oxides, nickel hydrides, and particulates of nickel metal.

"Caustic manufacturing process" refers to a manufacturing process wherein alkali metal hydroxides are treated to produce a more concentrated by weight percent solution. Included in this definition, but not a limitation of this definition is the caustic manufacturing process wherein rock salt is processed into a brine, or brine is used as the initial material, and the salt solution is then passed into an electrolytic cell of the diaphragm type or membrane type, and then with the application of electricity, the cell separates the components into hydrogen, chlorine and caustic. The caustic is then further treated with various evaporation, cooling and filtration techniques to produce a more concentrated alkali metal hydroxide solution. It is consider within the scope of this definition to include all caustic solutions, which include solutions of sodium, lithium, cesium, potassium and rubidium.

"Chlor-alkali" when referred to herein, is the generic industry term used to define the process of making simultaneously chlorine and caustic from a sodium chloride solution.

The present invention can be used for any caustic manufacturing process, but the most preferred embodiment is for use in an alkali metal hydroxide aqueous solution manufacturing process, which involves a diaphragm electrolytic cell for the separation of chlorine, caustic and hydrogen.

Details of the general electrolytic process for the manufacture of a caustic stream are presented in U.S. Pat. No. 4,025,405, which is incorporated by reference herein.

A caustic solution which can be treated by the method of the present invention is typically produced from a diaphragm type electrolytic cell. The most preferred embodiment of this invention utilizes the MDC-29 electrolytic system available from Eltech Systems Corporation of Chardon, Ohio.

The present invention involves a method to prevent cladding or plating of metals, such as nickel or iron in a production of alkali metal hydroxides which involves several steps:
  a. electrolyzing an aqueous alkali metal salt solution forming hydrogen, chlorine and an at least 10% caustic solution at a temperature of from about 75° C. to about 100° C. and said aqueous alkali metal salt solution has a pH of between about 2–6; and
  b. treating said at least 10% caustic solution to create a more concentrated caustic solution while magnetically removing up to 33% of the metals present in the solution from the at least 10% caustic solution using a first magnet prior to evaporation, flashing and cooling of the at least 10% caustic solution, and then magnetically removing an additional amount of metals from the resultant more concentrated caustic solution again with a second magnet prior to filtration of the more concentrated caustic solution.

It is intended that at least two magnets are used during the production process which is preferably continuous, however, a batch process could be used with the present invention.

The magnet's placement is critical. The first critical point is at the point prior to treatment by the first evaporator, which is typically constructed of nickel or plated with nickel, and then the second critical point is after the cooling step, and just prior to filtration.

Additional magnets are contemplated as usable in the present process, and it is considered important that these additional magnets be in situ and placed at points after filtration and just prior to the recycle stream entering the system.

This unique process has been analyzed and it has been determined that at least 10% by weight of metal and easily between 20 and 30% by weight of metal is removed from the manufacturing process using each of these magnets. This process is thought to remove metal circulating in the caustic solution and prevent the metal fom plating on the reaction vessels and piping, and thereby limiting the need for maintenance as was necessary in other commercial processes The following is a more detailed attempt to explain the preferred maintenance reduction step, which is the subject of the present invention and the detail is specifically noted in FIG. 2.

The caustic stream initially starts out as a cell liquor (22) with between 10–13 wt % caustic, most preferably 12 wt % caustic. Additionally, cell liquor (22) contains approximately 15% sodium chloride. Sodium sulfates maybe present in the cell liquor (22) as well. The balance of the cell liquor (22) is typically water. In addition, cell liquor (22) contains various metals, including but not limited to iron and nickel in the parts per million ranges (PPM).

In the preferred embodiment, the caustic stream is a sodium hydroxide stream.

Cell liquor (22) is typically pumped from feed tank (202) to flow through a first magnet (700) at a flow rate of typically between 600 to 900 gallons per minute, and a preferred flow rate of about 750–800 gals per minute. The temperature of the cell liquor (22) is typically maintained between 170–205 F. In the preferred embodiment, the temperature of the cell liquor (22) is maintained between 190–205 F.

Cell liquor (22) is passed through a first magnet (700) which can be one built by Eriez Manufacturing Company of Erie, Pa., as described in U.S. Pat. No. 5,236,091 which is hereby incorporated by reference. This first magnet magnetically removes up to about one third of the metals and their related hydrides and oxides, present in the cell liquor (22), typically nickel and/or iron or both.

In the most preferred embodiment, magnet (700) is a rare earth magnet, called a "permanent magnetic ferrous trap" and identifiable as model T10 Re3HP Trap, style 9900032, built by Eriez Manufacturing Company. It is contemplated that other magnets can be used, such as those manufactured by Industrial Magnetics of Boyne City, Mich. Rare earth magnets which are capable of trapping both iron and nickel are considered the most usable magnets in the present invention. It is considered to be within the scope of this invention to use other magnets, as is feasible giving the manufacturing parameters, such as electromagnets, ceramic magnets or other similar magnets.

Magnet (700) can be a tubular magnet, placed in situ in cell liquor (22). Other magnet geometries and shapes are also considered usable within the scope of the present invention. Simply, the aqueous solution of the manufacturing process needs to flow through or around the magnet (700) to enable entrapment of the metal oxides, hydrides, particles and free metals.

If a tubular, rare earth magnet is used, the size of the magnet will depend on the flow rate of the cell liquor (22) and the size of the piping and tanks used to manufacture the caustic. It is possible that within the scope of this invention the tubular magnet be of a size that has up to or in excess of 100 tubes. The size of the magnet will depending on the size of the facility and the composition of the actual stream. The viscosity of the cell liquor (22) will also effect the size and type of magnet usable in this process. It is contemplated that any size magnet can be used herein within generally accepted engineering principles for a particular process.

In the most preferred embodiment, it is contemplated that the magnet (700) has from 1 to 17 tubular members, and most preferably 11 tubular members. The most preferred embodiment contemplates a manufacturing flow rate of between 650 to 800 gallons per minute flowing from a vessel size of 16 ft diameter, by 15 feet high.

Testing using the chlor-alkali manufacturing process reveals that this first magnet (700) can remove up to about 33% of the metal present in the stream, particularly the nickel and/or iron, by removing such a large percentage of metal from the stream, then the remaining metals in the stream, particularly the metals of nickel and iron do not plate or clad onto the manufacturing equipment and stay in situ.

As an example, when nickel was present in the chlor-alkali caustic manufacturing system, and the manufacturing system ran at about 750–800 gals per minute, the particular amount of nickel removed is enough so that less than 0.1 ppm nickel can be detected in the stream. The process was tested to reveal it could handle nickel removal of between 0.5 PPM to 1.0 PPM nickel reduction in the stream flowing at 650–800 gals per minute. In those same streams, a similar amount of iron was removed by the first magnet (700) leaving small detection limits.

The resultant stream, containing less metal was then treated. This resultant stream, termed, the first fluid (24), was then passed to at least one evaporator.

The first fluid (24) is preferably passed through several evaporators to remove water from the fluid. In some cases, the first fluid (24) is passed through a quadruple effect evaporation system which utilizes a first evaporator (104), a second evaporator (103) and a third evaporator (102) forming concentrated caustic solution (26). After evaporator (102,) sodium borohydride (904) may optionally, be added to concentrated caustic solution (26) forming a more concentrated caustic solution (27). Sodium borohydride is typically added to reduce the reaction of hot caustic with the nickel evaporator.

Concentrated caustic solution (26) or more concentrated caustic solution (27) is then passed to another evaporator (101).

First evaporator (104) is preferably a Swensen evaporator, which is capable of evaporating off a portion of the water in the solution and thereby reducing the temperature of first fluid (24) to operate between about 120 to 135 F, and most preferably 130 F.

In the most preferred embodiment, the evaporator is constructed to handle the flow rates and characteristics of the incoming stream, and by way of example, a typical evaporator has a size of 18 feet 6 inch diameter, by 15 feet on the straight side. Preferably the evaporator is of stainless steel construction.

Second evaporator (103) is preferably a Swensen evaporator and in the preferred embodiment the second evaporator has a 15 foot diameter and a 15 feet 10 inch straight side. In the most preferred embodiment, ¾ inch stainless steel is used to construct this evaporator. Swensen evaporators are available from Swensen located in Harvey, Ill. In the preferred embodiment, the operating temperature of the second evaporator (103) operates in the range of 170 to 185 F, and most preferably at 180 F.

Third evaporator (102) preferably has a 14 foot diameter and a 15 foot 10 inch straight side. In the most preferred embodiment, this evaporator (102) is made from nickel and operates at a temperature range between 220–230 F and most preferably at about 225 F.

In one embodiment, an amount of sodium borohydride is added to establish between 10 to 20 PPM of sodium borohydride in the concentrated caustic solution (26). In the preferred embodiment, the solution known as the brand Venpure from Morton, International, of Chicago, Ill. can be used. The solution with the sodium borohydride added is known as a more concentrated caustic solution (27). Venpure is a registered trademark of Morton.

Sodium borohydride is a strong reducing agent which donates hydrogen to the solution. Sodium borohydride is stable, has a long storage time, and is easy to handle. In the most preferred embodiment, 12% NaBH4 is in a solution of 40% NaOH and approximately 48% H2O.

Since nickel is typically used as the construction material of the evaporators, sodium borohydride works by suppressing the reaction of the nickel with the caustic.

More concentrated caustic solution (27) is fed to yet a fourth evaporator (101), which is preferably another Swenson evaporator capable of evaporating off still more water from the more concentrated caustic solution (27). This evaporator preferably has a 13 foot diameter, and a 17 feet 10 inch diameter straight size. In the most preferred embodiment, this evaporator is made from nickel and operates at a temperature range between 325° to 335° F. and most preferably at about 330° F. The resulting solution is a highly concentrated caustic solution (28). Highly concentrated caustic solution (28) has a caustic wt % concentration range of between 44 wt % to 47 wt % caustic, most preferably 47 wt % caustic.

Highly concentrated caustic solution (28) is then passed through one or more flash pans to further concentrate the caustic concentration to 49 to 51% caustic. The flash pans serve to cool the highly concentrated caustic solution (28) from a temperature of between 325° F. to 335° F. to about between about 180°–200° F.

It is within the scope of the present invention to only use one flash pan or one evaporator with the manufacturing process. However, in the preferred embodiment, four evaporators and three flash pans (111), (112), (113) are used. Usable flash pans are available from the Swensen Company of Illinois and typically are made from nickel having a dimension of 4 feet in diameter and 14 feet high.

Fluid from flash pans (111), (112) and (113) is referred to as second fluid (29). After flashing, second fluid (29) is cooled.

In the preferred embodiment, eight coolers are used (301), (302), (303), (304), (305), (306), (307), and (308). The coolers (301) through (308) cool second fluid (29) to between 75 and 100 F. Coolers usable in the scope of the present invention can be agitated tanks with coils cooled by cooling tower water which reduces the second fluid (29) temperature by 8 to 18 degrees Fahrenheit per cooler. The resulting stream is cooled solution (30).

Cooled solution (30) is passed directly through second magnet (702) or can be divided or diverted through the second magnet (702) as cooled solution (30) and then flowed to a clarifier (413) as first cooled solution stream (906). Second magnet (702) extracts an additional percentage of metal, such as nickel and/or iron forming a second cooled stream (33).

It is contemplated that second magnet (702) is smaller in size and number of tubes than the first magnet (700). In the preferred embodiment, a magnet of between 5 and 17 tubular members can be used as magnet (702) and most preferably magnet (702) is a 7 tubular member magnet. The 7 tubular member magnet should be capable of tolerating fluid flow rates of between 50 and 150 gallons per minute and more preferably, between 100 and 110 gallons per minute. In the most preferred embodiment, the flow rate is 100 gallons per minute.

Flow rates through or around the magnets (700) and (702) can change depending on the viscosity, density and other physical properties of the fluid going through or around the magnets. Accordingly, different flow rates can be used within the scope of the present invention based on normal engineering principles for this manufacturing process.

To work at optimum levels of efficiency, it is contemplated that the magnets of the present invention be inspected and cleaned by washing on a periodic basis. Interior tubular members of the magnets may need to be removed from the magnet housing situated in the fluid of the manufacturing process. This cleaning may be needed once every 12-hour shift, but it may not be needed that often, depending on the concentration of metal in the fluid.

Other types of magnets can be used within the scope of the present invention other than these tubular magnets. Any magnet can be used which is capable of removing the metal particles, particularly the iron and nickel in the fluid of the manufacturing process.

After passing through second magnet (702), the resulting solution is a second cooled solution (33) and this solution is then passed to a filter (602). Filter (602) is preferably a pressure leaf filter such as those made by Duriron Co. Inc. of Angola, N.Y.

It is contemplated to be within the scope of this invention to use two filters, filter (602) and an identical filter, (not shown in the Figure) in this caustic manufacturing process (2). The second filter, although not required, can be used operationally while filter (602) is cleaned or flushed with additional cell liquor (900) during filtrate removal and/or related maintenance.

Preferably a Durco 60 HC 1040 filter is used. It is contemplated for the best mode of operation, that filter (602) and the optional identical filter (not shown) have filter areas of 1040 sq. feet and 36 leaves. Other filters are considered usable within the scope of this invention and this filter is not considered the only one usable herein. Also, the two filters could be of different sizes as long as the manufacturing flow capacity is met by the filtration step.

Filter (602) forms a filtered solution (38) which is passed to a third magnet (704) which magnetically removes additional metals, such as iron and nickel. The resulting solution is at least 40–55 wt % caustic and preferably 49–51 wt % with less than 0.1 ppm nickel content (40).

Magnet (704) is preferably a rare earth magnet called a model HTT03R (3 inch body size) magnet build by Industrial Magnets located in Boyne City, Mich.

Liquid from salt stream collection tank (407) (hereafter termed the final stream (44)) can then be optionally passed through an additional magnet (706) and additional nickel or iron or both can be magnetically removed from the final stream (44). Magnet (706) is preferably a rare earth magnet having between 1 and 17 tubular members, most preferably 7 tubular members and a four-inch housing.

Final stream (44) passing out of magnet (706) flows to feed tank (202) for recycling through this caustic manufacturing process via feed line (908).

Optionally, but not required in the present invention is the additional step of passing first cooled solution (906) through a clarifier (413) for separating solids and salts and forming a salt stream (36), a separated stream (34) which is then directed to a feed tank (406), and a scum box stream (32). In the commercial embodiment of this invention, feed tank (406) is connected to magnet (702) via feed tank line (909).

Clarifier (413) is a tank with a rake used to separate the first cooled solution (906). The clarifier (413) uses an EIMCO 25 foot, 8-inch diameter rake with a 4 by 7 and ½ inch straight depth.

As a result of passing through clarifier (413), salt stream (36) is a thickened salt slurry stream. This stream flows to solid bowl (401). The solid bowl (401) acts as a centrifuge to further separate out the salts from the liquid.

The separated stream (34) is 40–55 wt %, preferably 49–51 wt % caustic, which flows to tank (406). The scum box stream (32) is a salt slurry stream, which flows into salt stream collection tank (407).

In the preferred embodiment, scum box stream (32) is passed through a scum box (950) to collect the foam from the top of the scum box (950) before flowing to salt stream collection tank (407).

Solid bowl (401) acts as a centrifuge to separate out liquid (37) (containing 50% caustic) from heavy salt forming a heavy salt stream (42). The separated caustic liquid (37) can then be recycled back to a cooler, such as cooler ( 301). The resulting heavy salt stream (42) is passed to the salt stream collection tank (407). Two streams, (42) and (32) are combined in salt stream collection tank (407).

It is contemplated to be within the scope of the invention that this magnetic process for the removal of nickel and/or iron from a caustic manufacturing process can be performed as a batch removal process, or in situ as part of a continuous flow manufacturing process.

With the above description, the present invention consists of the combination and arrangement of parts, and steps described herein and illustrated in the accompanying figures, however, it is understood that changes may be made in the order of the steps, size of the units, and minor details without departing from the sprit of the present invention.

What is claimed is:

1. A method to control the in situ cladding of metal onto surfaces of production equipment, vessels and piping for the production of alkali metal hydroxides, the method which comprises, continuously providing a cell liquor containing metal to a first magnet;

magnetically removing up to about one third of said metal present in the cell liquor forming a first fluid;

evaporating a significant amount of water out of said first fluid using at least one evaporator and raising the temperature of the first fluid to above 330 F forming a highly concentrated solution, and then further evaporating using flash pans forming a second fluid;

cooling said second fluid using at least one cooler forming a cooled solution;

continuously providing the cooled solution to a second magnet;

magnetically removing an additional amount of said metal from said cell liquor forming a second cooled stream;

filtering said second cooled stream using at least one filter and forming a filtered solution;

continuously providing the filtered solution to a third magnet; and magnetically removing any additional metal from said filtered solution forming a alkali metal hydroxide containing 40–55 wt % caustic.

2. The method of claim 1 wherein between 20–33% by weight metal is removed from the cell liquor and the resultant stream is between 49 and 51% caustic by weight.

3. The method of claim 1, wherein the metal is selected from the group iron and nickel.

4. The method of claim 1, wherein the alkali metal hydroxide is selected from the group, sodium, lithium and potassium.

5. The method of claim 1, comprising the additional steps of:
passing the cooled solution to a clarifier which forms three streams, a scum box stream, a separated stream and a salt stream;
flowing salt stream to solid bowl forming a solid stream;
flowing the separated stream to said second magnet and magnetically removing any remaining metal forming second cooled solution.

6. The method of claim 5, wherein said solids stream is flowed to salt stream collection tank, which flows to final stream which flows to a fourth magnet which magnetically removes additional metal from the solids stream and then is passed to first magnet.

7. The method of claim 1, wherein the first magnet has between 1 and 17 tubular members.

8. The method of claim 1, wherein the second magnet has between 1 and 7 tubular members.

9. The method of claim 1, wherein the third magnet is approximately the same number of tubular members as the second magnet.

10. The method of claim 1, wherein said evaporating step uses between 1 and 4 evaporators.

11. The method of claim 1, wherein said evaporative step uses between 1 and 4 evaporators and between 1 and 3 flash pans.

12. The method of claim 1, wherein said cooling step uses between 1 and 8 coolers.

13. The method of claim 1, further comprising adding sodium borohydride to the solution after the evaporation step and prior to cooling said second fluid.

14. The method of claim 1, wherein the first magnet is larger than the second and third magnets.

15. The method of claim 1 wherein the metal is a nickel selected from the group comprising nickel oxide, nickel particulate, and free nickel ions.

16. The method of claim 1, wherein the metal is an iron selected from the group iron oxide, particulate iron and free iron ions.

17. A process for the continuous production of alkali metal hydroxide substantially free from metal plating build up by removing metals with magnets and the steps comprise:
a. electrolyzing an aqueous alkali metal salt solution forming hydrogen, chlorine and an at least 10% caustic solution at a temperature of from about 75 to about 100 C and a pH of between about 2–6; and
b. treating said at least 10% caustic solution to create a more concentrated caustic solution while continuously and magnetically removing up to 33% of the metals present in the solution from the at least 10% caustic solution using a first magnet prior to evaporation, flashing and cooling of the at least 10% caustic solution, and then magnetically removing an additional amount of metals from the resultant more concentrated caustic solution again with a second magnet prior to filtration of the more concentrated caustic solution.

18. The process of claim 17, further comprising the step of washing said magnets regularly to remove the build up of metal on said magnets.

19. The process of claim 17, wherein said metals are selected from the group, nickel, iron, particulate nickel, particulate iron, ferrous oxide, nickel oxide and related nickel and iron compounds and combinations thereof.

20. The process of claim 17, wherein said at least two magnets are rare earth magnets.

* * * * *